United States Patent [19]
Nicoloff, Jr. et al.

[11] Patent Number: 5,654,744
[45] Date of Patent: Aug. 5, 1997

[54] SIMULTANEOUSLY PRINTING WITH DIFFERENT SECTIONS OF PRINTHEADS FOR IMPROVED PRINT QUALITY

[75] Inventors: Nicholas Nicoloff, Jr., La Mesa, Calif.; Mark S. Hickman, Vancouver, Wash.

[73] Assignee: Hewlett-Packard Company, Palo Alto, Calif.

[21] Appl. No.: 399,401

[22] Filed: Mar. 6, 1995

[51] Int. Cl.⁶ .............................. B41J 2/21; B41J 2/145; B41J 2/15
[52] U.S. Cl. .............................. 347/43; 347/40
[58] Field of Search .............................. 347/43, 15, 13, 347/40

[56] References Cited

U.S. PATENT DOCUMENTS

| | | |
|---|---|---|
| 4,812,859 | 3/1989 | Chan et al. . |
| 4,833,491 | 5/1989 | Rezanka . |
| 4,965,593 | 10/1990 | Hickman . |
| 4,967,203 | 10/1990 | Doan et al. .............................. 346/1.1 |
| 4,999,646 | 3/1991 | Trask . |
| 5,278,584 | 1/1994 | Keefe et al. . |
| 5,376,958 | 12/1994 | Richtsmeier et al. . |
| 5,455,610 | 10/1995 | Harrington .............................. 347/43 |

FOREIGN PATENT DOCUMENTS

| | | | |
|---|---|---|---|
| 0348181A2 | 12/1989 | European Pat. Off. ............. | B41J 3/04 |
| 0546853A1 | 6/1993 | European Pat. Off. ............. | H04N 1/18 |
| 0433556 | 6/1991 | Germany . | |

*Primary Examiner*—Benjamin R. Fuller
*Assistant Examiner*—Thinh Nguyen

[57] ABSTRACT

In one embodiment of the invention, a scanning carriage in a color inkjet printer houses three identical color pens for printing cyan, magenta, and yellow. A separate array of nozzles is associated with each color ink. The nozzle arrays are such that they scan over the same print area of the medium during a single scan. To prevent the wet ink from one color swath being deposited over or bleeding into the wet ink from another color swath during the same scan, only a section of each nozzle array is used for printing during a single scan such that wet ink of two different colors cannot overlap during a single scan. This technique reduces ink bleed between colors as well as paper cockle. In another embodiment, a single tricolor pen is used where a single nozzle plate contains three nozzle arrays, one for each color. A section of each nozzle array is used during a single scan, as described above, to prevent wet ink of two different colors from overlapping during a single scan.

19 Claims, 13 Drawing Sheets

SIMULTANEOUSLY PRINTING WITH DIFFERENT SECTIONS OF PRINTHEADS FOR IMPROVED PRINT QUALITY

BACKGROUND OF THE INVENTION

This invention relates generally to printers and, more specifically, to printing techniques for color printers.

Thermal inkjet printers operate by selectively energizing heating elements to expel droplets of ink through associated nozzles. Each heating element, which is typically a pad of resistive material about 50 μm by 50 μm in size, is located in a chamber filled with ink supplied from an ink reservoir. A nozzle plate, defining an array of nozzles, overlies the various chambers. Upon energizing a particular heating element, a portion of the ink in the chamber is vaporized and a droplet of ink is expelled through an associated nozzle toward the print medium, whether paper, fabric, or the like. The firing of the heating elements is typically under the control of a microprocessor, the signals of which are conveyed by electrical traces to the heating elements. The arrangement of printed dots may form any pattern, such as text or graphics.

One embodiment of an inkjet pen is described in Hewlett-Packard's U.S. Pat. No. 5,278,584, by Brian J. Keefe, et al., entitled INK DELIVERY SYSTEM FOR AN INKJET PRINTHEAD, incorporated herein by reference.

Some of Hewlett-Packard's color printers will include a scanning carriage housing one inkjet pen containing black ink, as well as housing one or more color inkjet pens for printing cyan, magenta, or yellow ink. These color inkjet pens typically have a resolution of 300 dots per inch (dpi) in both the x and y axes and a printhead width (along the direction of paper travel) on the order of one-third inch.

During printing, the pens are scanned across the width of the medium to be printed upon while the medium remains stationary. During each scan, the cyan, magenta, and yellow inks are ejected by the nozzles under control of the microprocessor to create the desired colors and patterns. Each completed scan across the medium can print a swath approximately as wide as the width of the entire nozzle array of a pen. After each scan, during which all colors and the black ink may be printed, the medium is moved forward the width of a swath, and the pens begin printing the next swath.

The color pens may be either a single tricolor pen, having three sets of nozzles for cyan ink, magenta ink, and yellow ink, respectively, or consist of three separate and identical pens each containing a respective one of the cyan, magenta, or yellow inks. Secondary colors are obtained by overlapping the various colors of ink or printing different color dots adjacent one another.

Various problems arise when printing using the above technique. Because of the wet ink being drawn into the surrounding dry media by capillary action, the edges of the printed images tend to become less defined. Also, when inks of differing colors are printed adjacent to each other, the different color inks tend to bleed into each other. Another problem encountered in inkjet printing is paper cockle. The ink used in inkjet printing is typically of a liquid base. When the liquid ink is deposited on wood-based papers, it absorbs into the cellulose fibers and causes the fibers to swell. As the cellulose fibers swell, they generate localized expansion, which, in turn, causes the paper to warp (cockle) in these regions. This can cause a degradation of print quality due to uncontrolled pen-to-paper spacing, and can also cause the printed output to have a low quality appearance due to the wrinkled paper.

What is desirable is a method for controlling the color pen(s) in a scanning carriage to mitigate the above-mentioned problems of ink bleed and cockle.

BRIEF SUMMARY OF THE INVENTION

In one embodiment of the invention, a scanning carriage in a color inkjet printer houses three identical color pens for printing cyan, magenta, and yellow. A separate array of nozzles is associated with each color ink. The carriage may also house a black pen. The nozzle arrays are such that they scan over the same print area of the medium during a single scan. To prevent the wet ink from one color swath being deposited over or bleeding into the wet ink from another color swath during the same scan, only a section of each nozzle array is used for printing during a single scan such that wet ink of two different colors cannot overlap during a single scan. This gives the color ink deposited in one scan time to dry and penetrate the medium before a second color is deposited over that previously deposited color. This technique reduces ink bleed between colors as well as paper cockle.

In another embodiment, a single tricolor pen is used where a single nozzle plate contains three nozzle arrays, one for each color. A section of each nozzle array is used during a single scan, as described above, to prevent wet ink of two different colors from overlapping during a single scan.

This is an improvement over a staggered pen approach, since existing carriage and pen alignment techniques may be used. Also, a staggered pen approach would increase the size of the carriage.

DETAILED DESCRIPTION OF THE PREFERRED EMBODIMENTS

Figure 1:
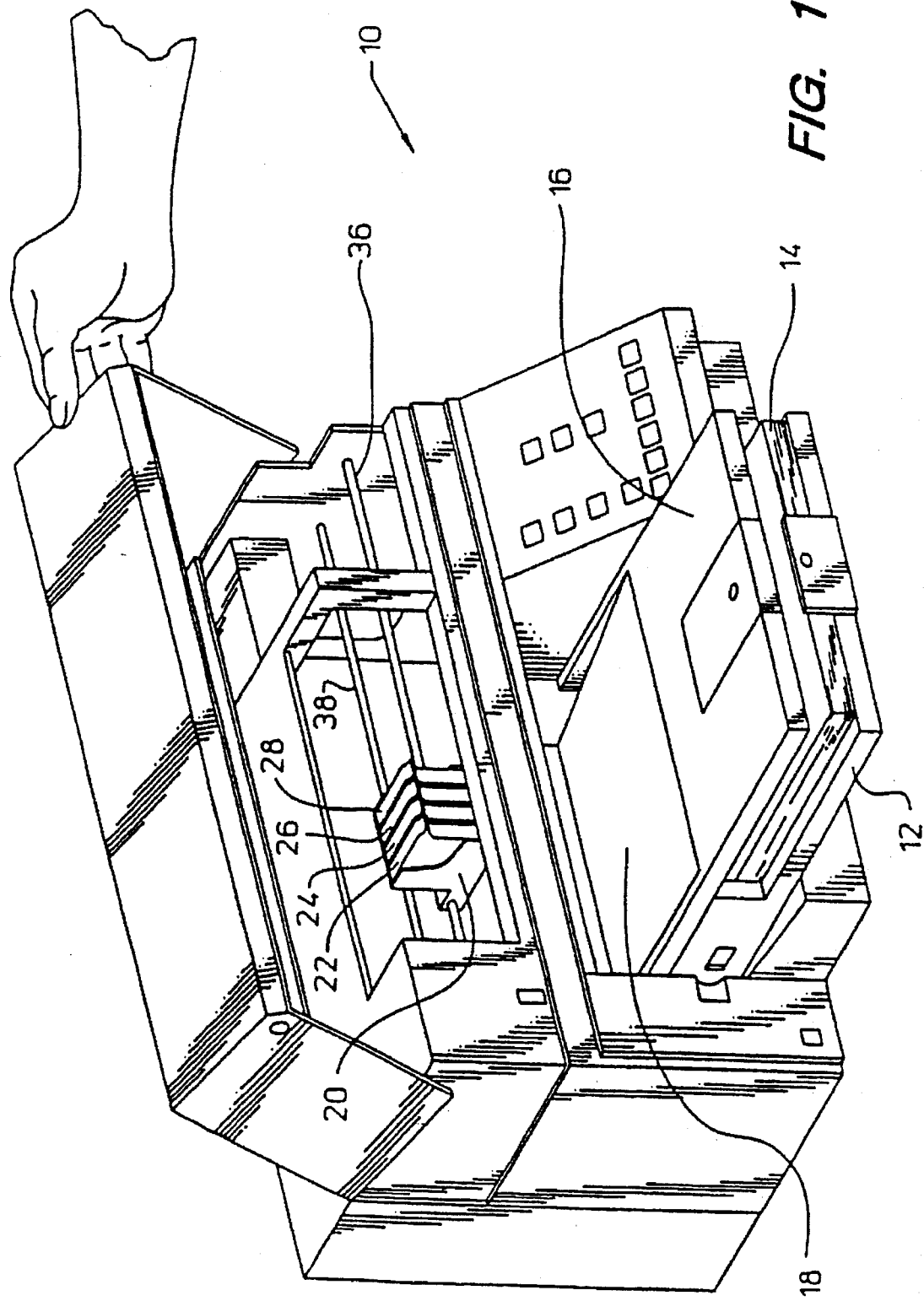
FIG. 1 shows a typical inkjet printer which can incorporate the apparatus and method of the present invention.
Figure 2:
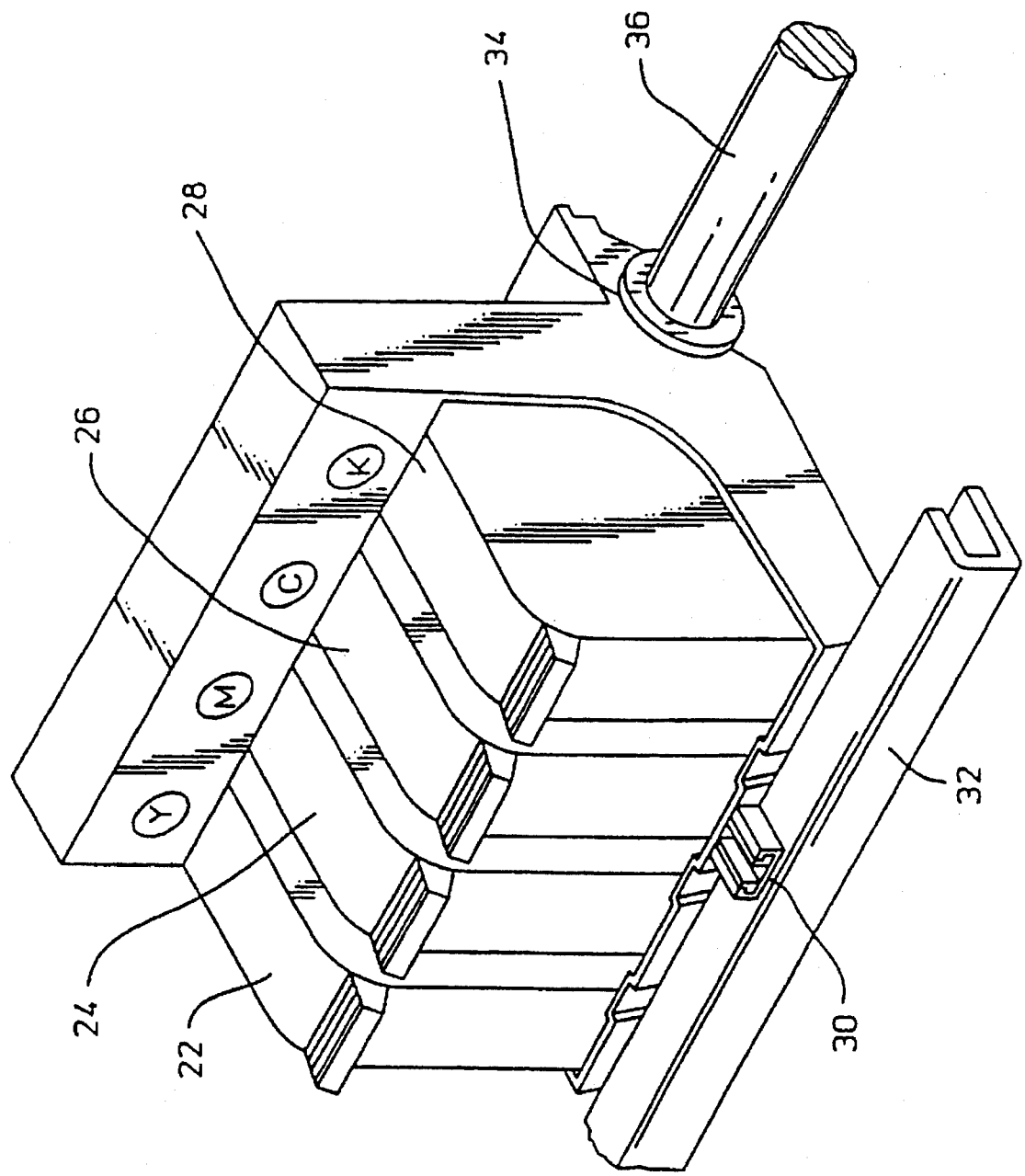
FIG. 2 shows a carriage having removable multi-color print cartridges, which can incorporate the apparatus and method of the present invention.
Figure 3:
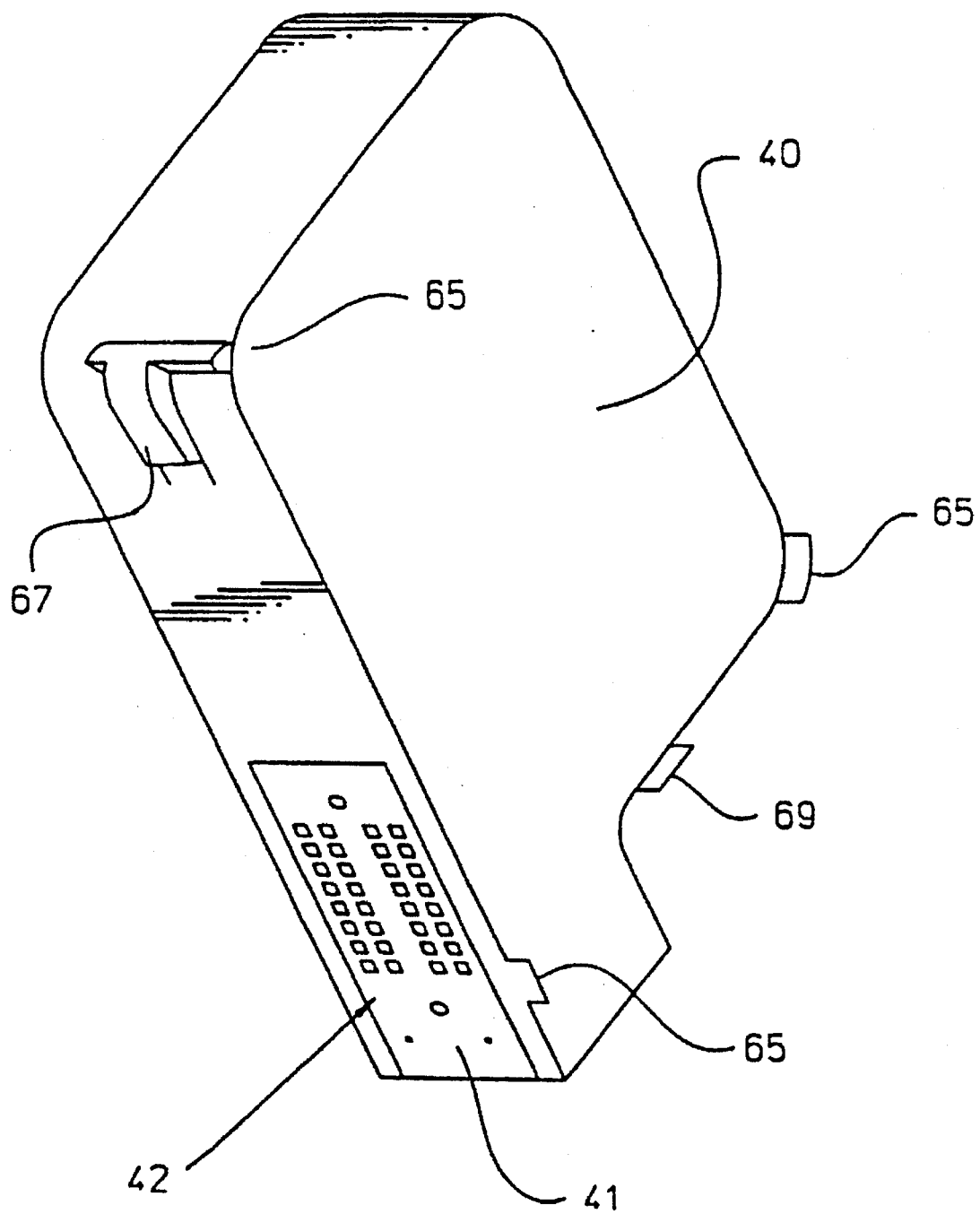
FIG. 3 shows an exemplary lower resolution color inkjet print cartridge used in one embodiment of the invention.

Even though the invention can be used in any type of color printer, an embodiment of the invention will be explained in the context of an inkjet printer of the type shown in FIG. 1. In particular, inkjet printer 10 includes an input tray 12 containing sheets of media 14 which pass through a print zone, and are fed past an exit 18 into an output tray 16. Referring to FIGS. 1-2, a movable carriage 20 holds print cartridges 22, 24, 26, and 28 which respectively hold yellow (Y), magenta (M), cyan (C) and black (K) inks. The front of the carriage has a support bumper 30 which rides along a guide 32 while the back of the carriage has multiple bushings such as 34 which ride along slide rod 36. The position of the carriage as it traverses back and forth across the media is determined from an encoder strip 38 in order to be sure that the various ink nozzles on each print cartridge are selectively fired at the appropriate time during a carriage scan.

Figure 14:
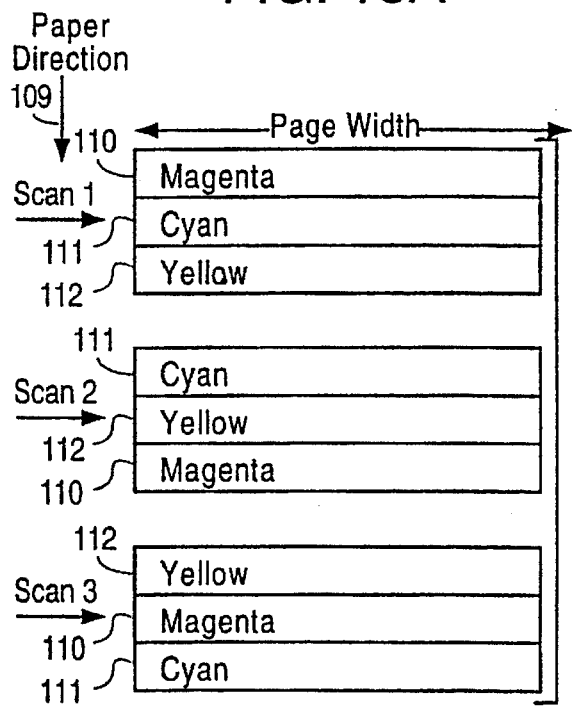
FIGS. 14, 15 and 16 illustrate the selective energization of sections of a printhead to prevent different colors of ink from overlapping during a single scan of a carriage across a medium.
Figure 15:
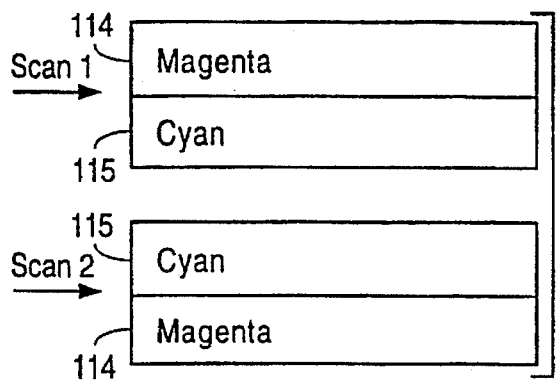
Figure 16:
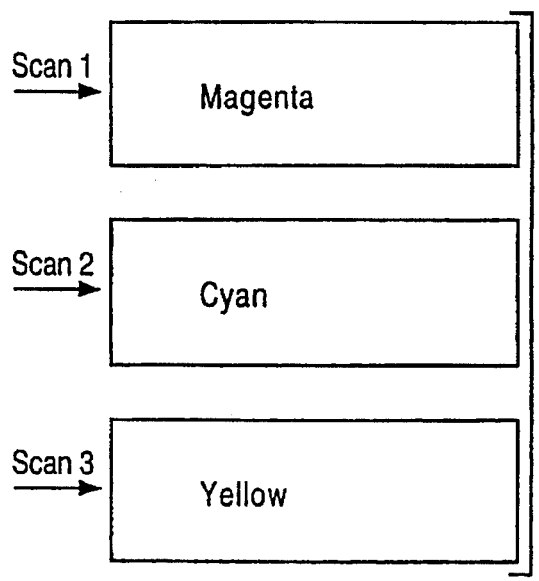

In another embodiment printer, the color print cartridges 22, 24, and 26 are replaced by a single tricolor cartridge having a nozzle plate such as shown in FIG. 14, 15, or 16.

Figure 4:
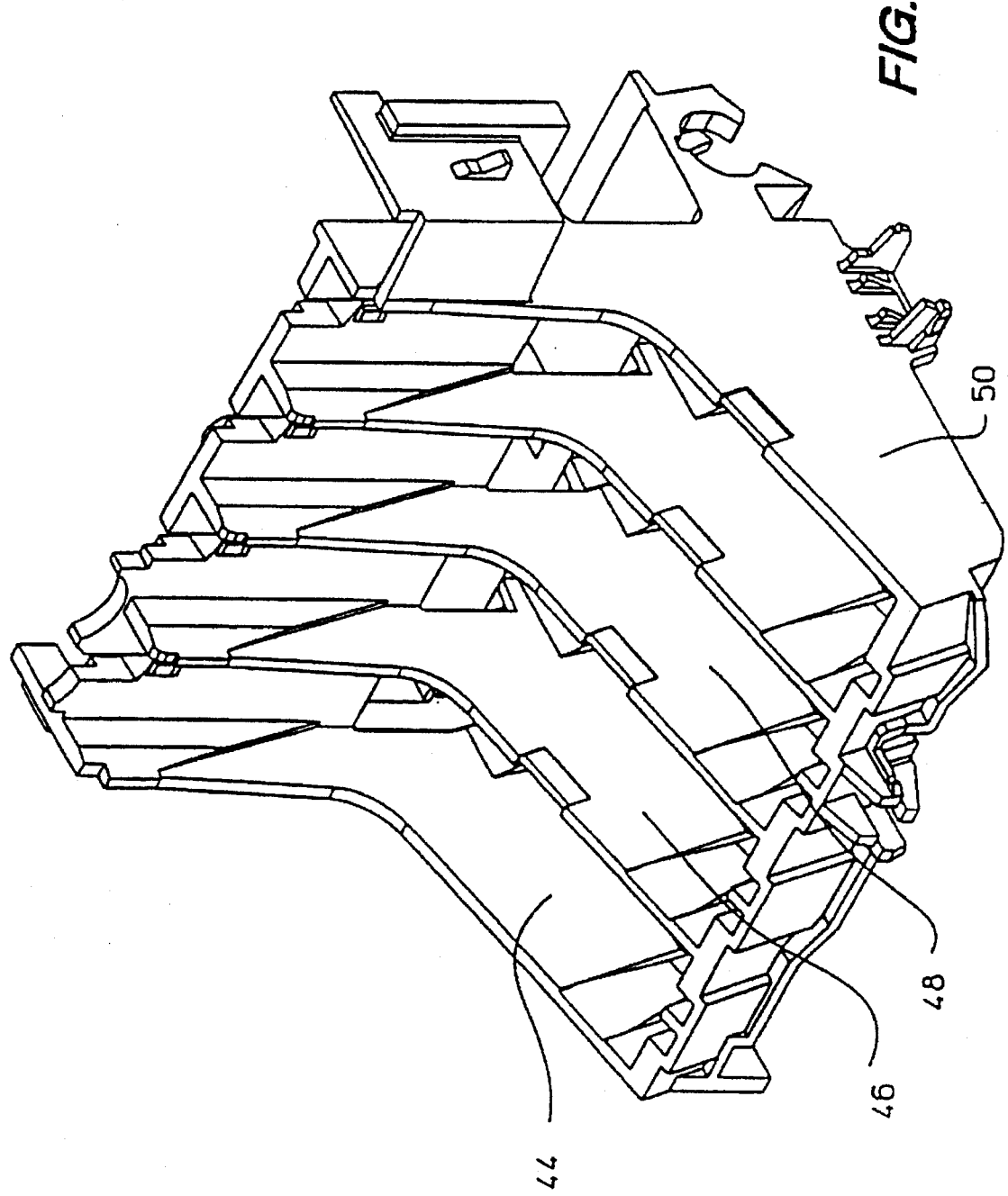
FIG. 4 is a perspective view of a carriage incorporating one embodiment of the invention in an inkjet printer.
Figure 5:
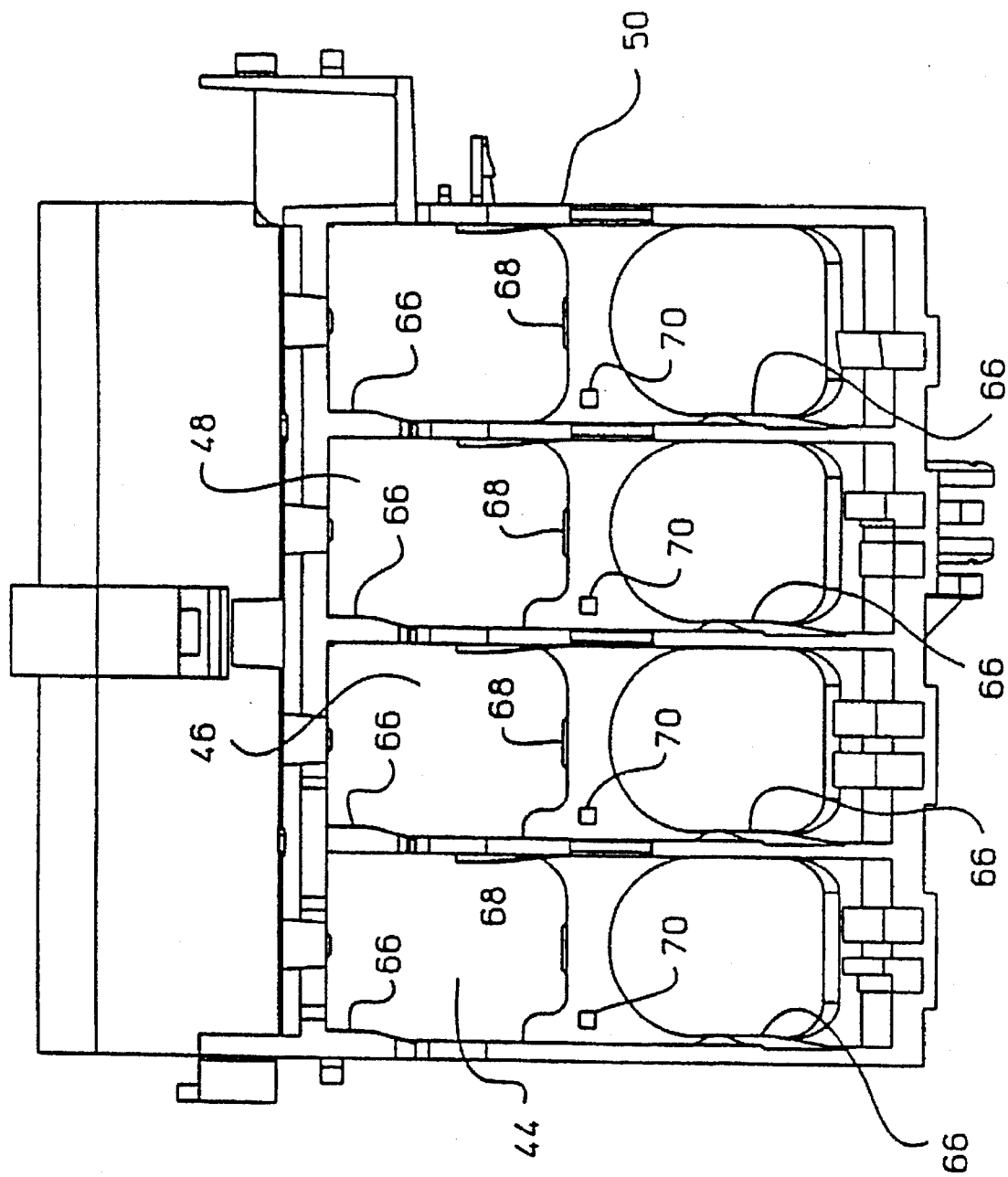
FIG. 5 is a top view of the carriage of FIG. 4.
Figure 6:
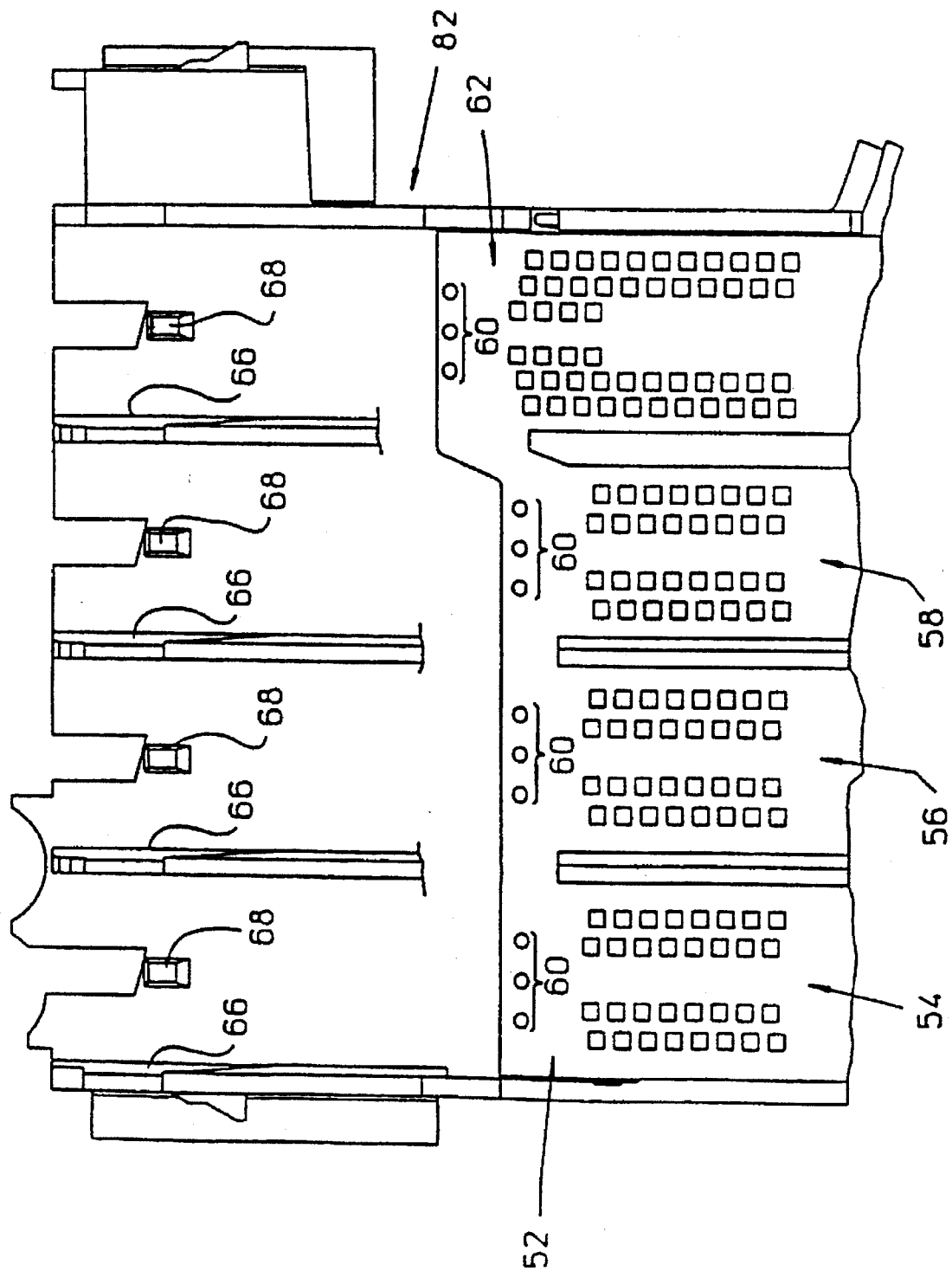
FIG. 6 is a fragmentary view of the flex-circuit interconnect on the carriage of FIGS. 4 and 5, with the interior carriage walls cut away.

Referring to FIGS. 3-6, a 300 dpi color inkjet cartridge 40 having a tab-circuit with a four column thirty-two pad electrical interconnect 42 is removably installed in three chutes 44, 46, 48 of a unitary carriage 50 (FIG. 4). A flex-circuit member 52 (FIG. 6) having three matching sets of conductive pads 54, 56, 58 is mounted on flex-frame pins 60 for operative engagement with the cartridge pads when the cartridge is inserted into its appropriate chute. An enlarged set of conductive pads 62 covering a larger area, having a different layout, and constituting an array of six columns totaling fifty-two conductive pads on the flex-circuit member is designed for operative engagement with cartridge pads on a 600 dpi black inkjet cartridge 64 (see FIG. 9).

The preferred structure and techniques for preventing mistaken installation of a 600 dpi black printhead in a color printhead chute, or alternatively the mistaken installation of a 300 dpi color printhead in a black printhead chute is described in the copending applications identified above and incorporated by reference herein.

Because of the differently configured electrical interconnect on the 600 dpi cartridge, and in order to avoid substantially changing the existing X/Y/Z datum configuration of the carriage, a unique interconnect scheme is employed. In that regard, the X-axis cartridge datums 65 engage the X-axis carriage datums 66, and the Y-axis cartridge datums 67 engage the Y-axis carriage datums 68, and the Z-axis cartridge datums 69 engage the Z-axis carriage datums 70 in a manner more fully described in the copending applications identified above and incorporated by reference herein.

Figure 9:
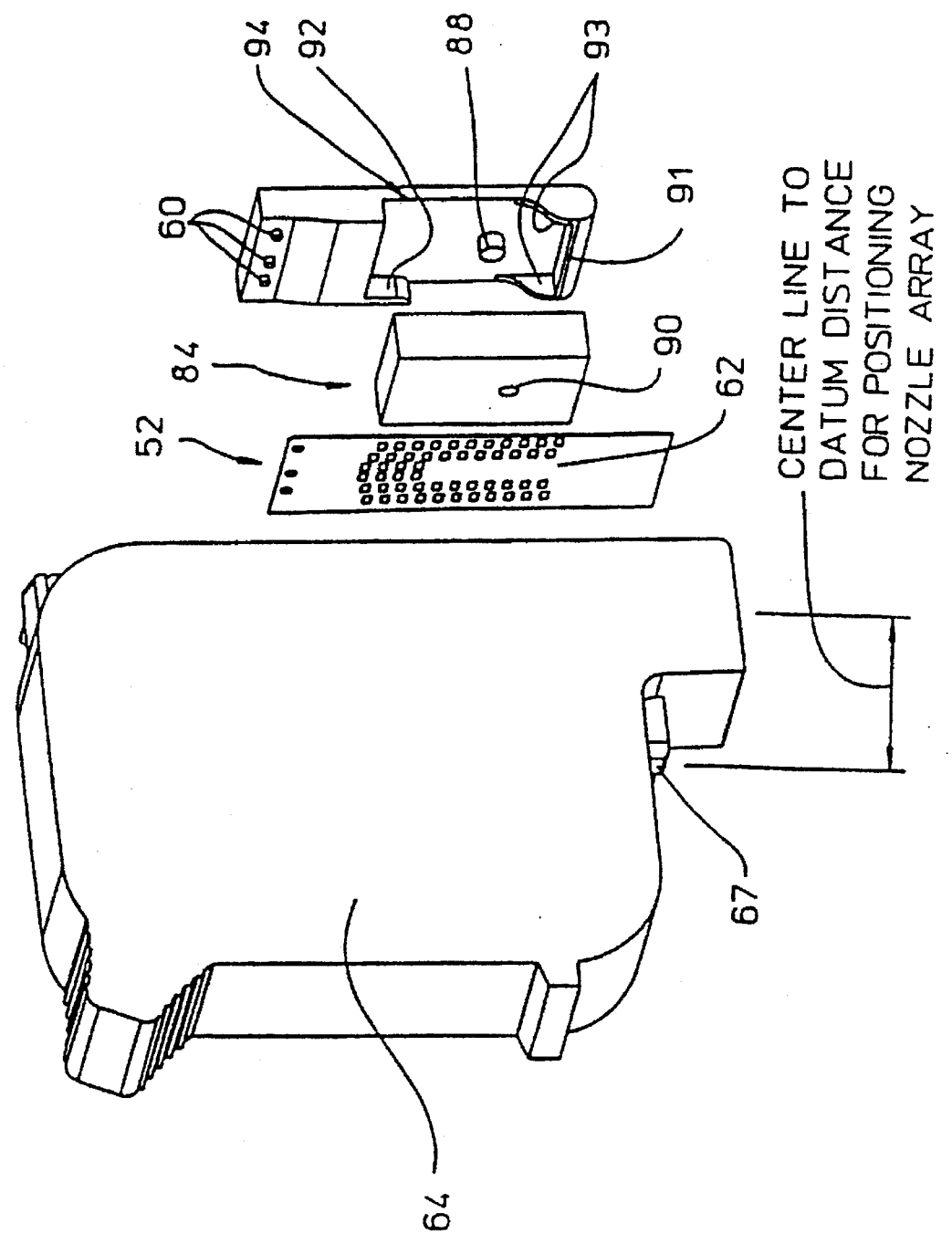
FIG. 9 is a schematic view showing the use of a foam member for operatively connecting a flex-circuit to a higher resolution black inkjet cartridge.
Figure 10:
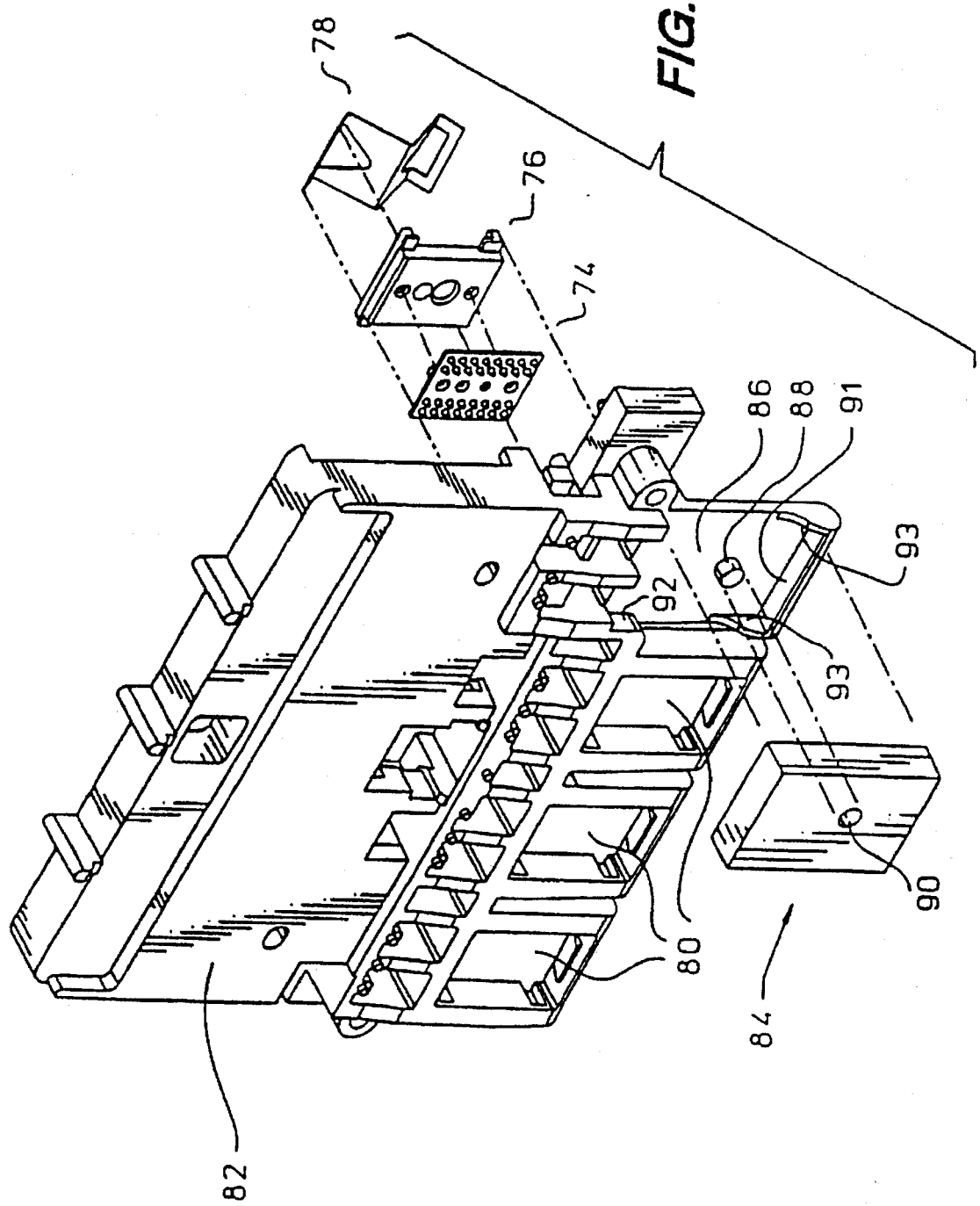
FIG. 10 is an exploded view showing a flex-circuit frame portion of a carriage, with the foam spring member of FIG. 9 for assuring pressure connection of a flex-circuit to a higher resolution black inkjet cartridge, and a metal spring member for assuring pressure connection of a flex-circuit to lower resolution color inkjet cartridges.
Figure 11:
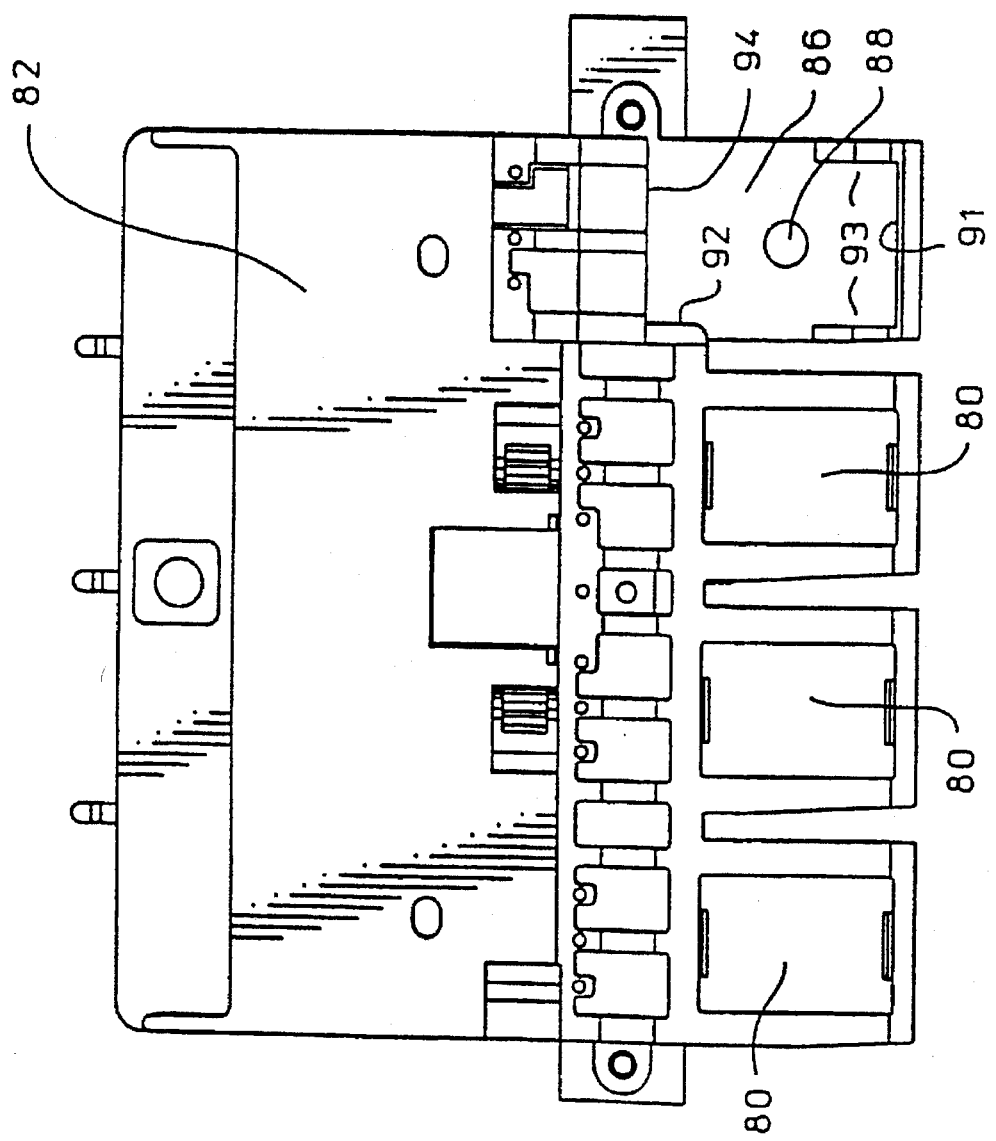
FIG. 11 is a front view of the flex-circuit frame of FIG. 10.

As best shown in FIGS. 9-11, a spring assembly including a backing sheet 74, a plate 76 and a gimbal spring 78 are sized for fitting into apertures 80 of flex-circuit frame 82 to assure proper electrical interconnection for the three color cartridges.

A unique spring assembly for the 600 dpi cartridge interconnect includes a unitary resilient foam member 84 which fits in a seat 86 which is larger than the aperture 80. A mounting peg 88 fits into matching hole 90 which along with bottom and lower ledges 91, 93 and upper side and top ledges 92, 94 hold the foam member in proper position to assure operative engagement across the electrical interconnect.

Figure 7:
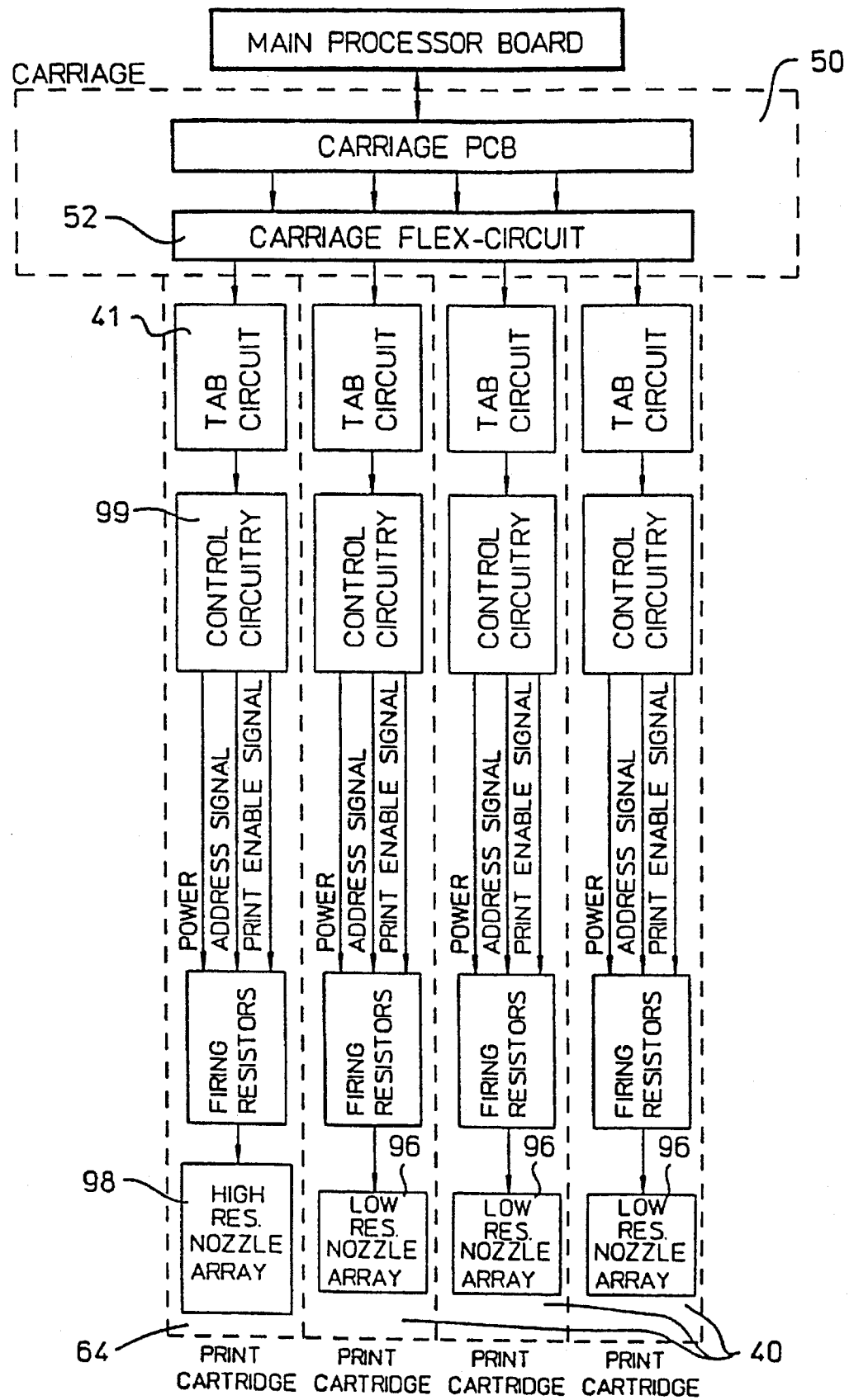
FIG. 7 is a schematic block diagram of the print cartridges in one embodiment of the invention.
Figure 8:
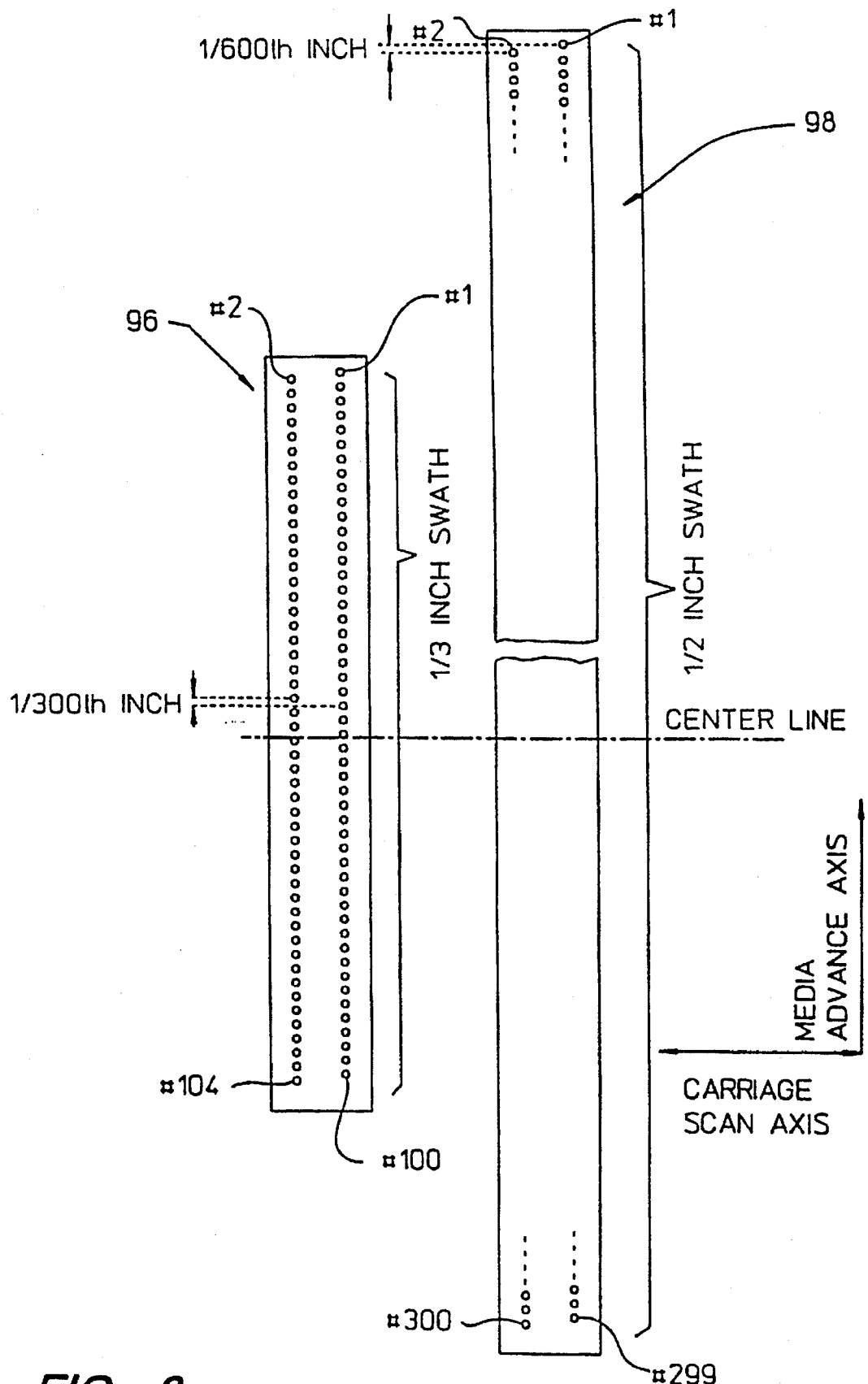
FIG. 8 is a schematic bottom view as seen looking up from the media showing one alignment relationship of the nozzle arrays of FIG. 7.

FIGS. 7-8 show one possible mounting relationship between a 300 dpi nozzle array 96 of the color printheads and a 600 dpi nozzle array 98 of the black printhead. Control circuitry 99 (including a multiplexer) on the substrate enables the three hundred firing resistors of the black printhead to be controlled through fifty-two electrical interconnect pads, and similarly enables all one hundred four firing resistors of each color printhead to be controlled through thirty-two electrical interconnect pads.

Figure 12:
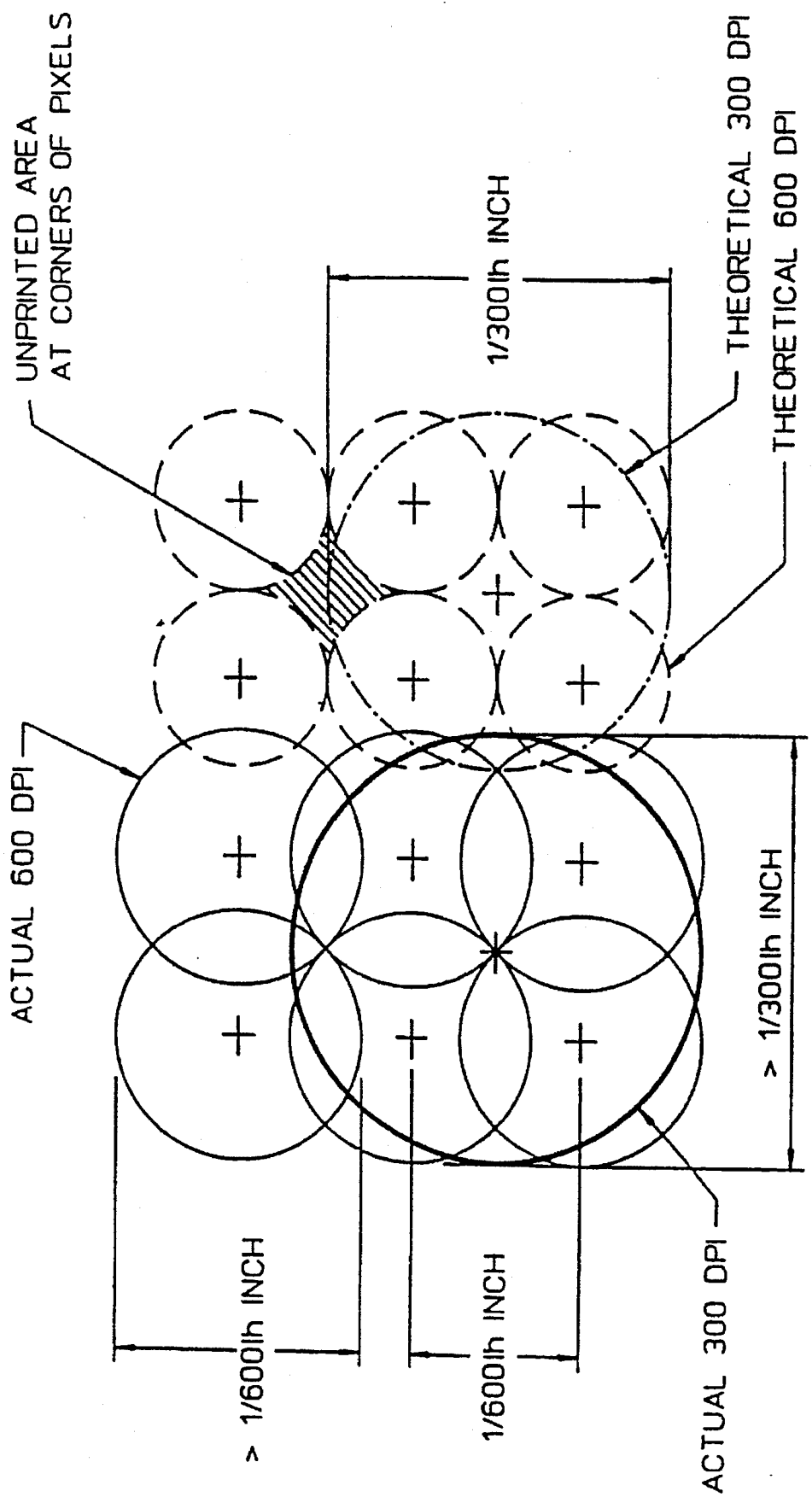
FIG. 12 is a schematic diagram showing the relative resolution between a 600 dpi printout of the black printhead and a 300 dpi printout of the color printheads in one embodiment of the invention.

FIG. 12 schematically shows the difference between the 300 dpi printout produced by the color pens (i.e., pen cartridges) and the 600 dpi printout of the black pen of the preferred embodiment described herein. The type of paper used, along with other well known factors, affect ink bleed. Therefore, the diameters of the actual printed dots in FIG. 12 will vary.

The inventive method described below applies equally to a printer using multiple color pens or a single tricolor pen.

Figure 13A:
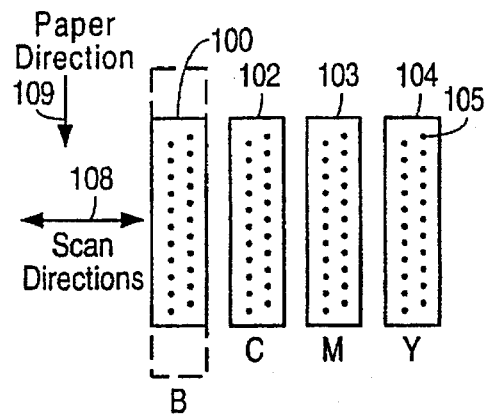
FIGS. 13A and 13B are schematic views as seen looking up from the media showing two different arrangements of black and color pens housed in a scanning carriage.

FIG. 13A is a schematic view as seen looking up from the media at the nozzle plates of the black pen 100, cyan pen 102, magenta pen 103, and yellow pen 104. The arrangement of the pens in the carriage 20 of FIG. 1 is not significant in this invention. Although the widths of the nozzle arrays may all be identical, the width of the nozzle array of the black pen 100 may be wider, as illustrated by dashed outline, to obtain faster printing speeds for black printing. The individual nozzles 105 are shown in simplified form, and a pen may contain many more nozzles.

Figure 13B:
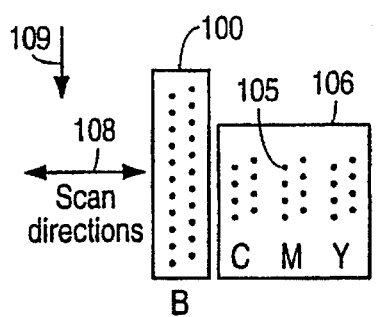

A functionally similar structure is shown in FIG. 13B, which shows the nozzle plate of a black pen 100 and that of a tricolor pen 106. Such a tricolor pen 106 contains three ink reservoirs each holding either cyan ink, magenta ink, or yellow ink, and each in fluid communication with an associated one of the three groups of nozzles 105. Such a tricolor pen 106 may be substituted for the three separate color pens in the scanning carriage illustrated in FIGS. 1 and 2. The scanning carriage of FIGS. 1 and 2 would be modified to support and align the tricolor pen 106 in a manner similar to that described with respect to the individual color pens.

In FIGS. 13A and 13B, the scanning direction of the pens across a page is shown by arrow 108, while the paper transport direction is identified by arrow 109.

In accordance with the present invention, instead of different colors of ink being simultaneously ejected along the entire width of the nozzle arrays of the various color pens 102-104 or the tricolor pen 106, only selected sections of each of the nozzle arrays may eject ink to avoid two colors of ink overlapping in a single scan of the carriage. The section of each nozzle array which may eject ink is changed for each scan of the carriage so that, after multiple scans, a complete swath of each color may be printed across the medium. By waiting until one color has dried (or substantially dried) before applying another color on top of it (during a different scan) or by preventing two different colors of wet ink from bleeding into each other, the print characteristics are better defined and there is less overall swelling of the paper, resulting in less curling.

To control which sections of the nozzle arrays eject ink, the control circuitry in the printer effectively blocks energization signals to the heating elements associated with the non-selected section of the nozzle arrays. During each scan, different groups of heating elements are effectively disabled. During these multiple scans, the medium is held stationary until an entire full-color swath is printed. The modifications to a conventional printer's hardware and any software (or firmware) required to carry out this invention would be understood by those skilled in the art after reading this disclosure.

FIGS. 14, 15, and 16 illustrate three embodiments of this method.

In FIG. 14, the paper or other medium is held stationary while the carriage containing the pens makes three scans back and forth across the paper. Printing may occur during both scan directions or during only one scan direction. In the first scan, only the heating elements associated with the top one-third of the nozzles in the magenta pen 103 (FIG. 13A) are selectively energized to print a top swath 110 of magenta ink across the page. Assuming there are 100 nozzles in each of the nozzle arrays of pens 102, 103, and 104, only the top 33 nozzles of the magenta pen 103 may eject ink. Simultaneously, only the heating elements associated with the middle one-third of the nozzles in the cyan pen 102 are selectively energized to print a middle swath 111 of cyan ink during this first scan. Simultaneously, only the heating elements associated with the bottom third of the nozzles in the yellow pen 104 are selectively energized during this first scan so as to produce the bottom yellow swath 112.

In a second scan of the carriage across the same portion of the medium, the heating elements associated with the top third of the nozzles in the cyan pen 102 are selectively energized, the heating elements associated with the middle third of the nozzles in the yellow pen 104 are selectively energized, and the heating elements associated with the bottom third of the nozzles in the magenta pen 103 are selectively energized.

In the third scan across the same portion of the medium, the heating elements associated with the top third of the nozzles in the yellow pen 104 are selectively energized, the heating elements associated with the middle third of the nozzles in the magenta pen 103 are selectively energized, and the heating elements associated with the bottom third of the nozzles in the cyan pen 102 are selectively energized.

After the three scans shown in FIG. 14, full swaths of cyan, magenta, and yellow ink have now been printed on the medium. The swaths 110, 111, 112 may occur in any order. The medium is then advanced a full swath width and the printing process is repeated.

Since many colors to be printed do not require all three of the primary colors, using a fixed three-scan approach would be inefficient. If only two colors were required to print a full swath across a medium, then only two scans would be required, as illustrated in FIG. 15. FIG. 15 illustrates the situation where only magenta and cyan inks are required to print the desired colors across a full swath. In a first scan, the heating elements associated with the top half of the nozzles in the magenta pen 103 and the heating elements associated with the bottom half of the nozzles in the cyan pen 102 are selectively energized to print swaths 114 and 115. In a second scan across the same portion of the medium, the heating elements associated with the bottom half of the nozzles in the magenta pen 103 and the heating elements associated with the top half of the nozzles in the cyan pen 102 are selectively energized. In this particular example, the yellow ink is not used.

The selective operation of the heating elements in the tricolor pen 106 (FIG. 13B) printhead is identical to that described above, since the three arrays of nozzles in the tricolor pen 106 are functionally equivalent to the three arrays of nozzles in pens 102, 103 and 104. In one embodiment, the nozzle array for each color in the tricolor pen 106 contains 64 nozzles instead of the 100 nozzles in the individual pens 102–104. The resulting printed swath across a page for each scan will be identical to those shown in FIGS. 14 and 15.

FIG. 16 illustrates another embodiment of the invention where heating elements associated with the full nozzle array for a single color are selectively energized during a single scan of the carriage. In this case, a full swath of a single color is printed during each scan. After each scan, a full swath of another color is printed. After three scans, all three colors are printed. In the particular example of FIG. 16, only the magenta pen 103 is energized for the first scan, only the cyan pen 102 is energized for the second scan, and only the yellow pen 104 is energized for the third scan.

A separate scan may be performed for the black pen 100 or the black pen 100 may be energized simultaneously with any of the color pens.

The selection of a particular nozzle array section to be used for printing during a scan may be predetermined, or the selection may be made dynamically, where such selection would depend on the colors required to be printed in a full swath across a page.

In another embodiment of the invention, the sections of the color pen printheads may be energized in the manner illustrated for the first scan in FIG. 14. The medium may then be forwarded after this first scan by a distance equal to one-third of the total swath width. The same sections of the printheads are again energized to print the same color pattern but effectively shifted down one-third swath width on the medium. This would cause the cyan ink to be printed over magenta ink from the previous scan, cause the yellow ink to be printed over cyan ink from the previous scan, and cause magenta ink to be printed over a blank portion of the medium. After another shift of the medium, the yellow ink printed in a third scan overlaps the cyan ink printed in the second scan which overlaps the magenta ink printed in the first scan. As would be understood, the dots of the various primary colors do not need to physically overlap to produce the appearance of additional colors.

The various sections of the nozzle arrays ejecting ink during a scan may also be changed during a single scan to avoid possible visual artifacts, as long as two overlapping colors are not printed during a single scan.

To reduce any visible artifacts caused by ink bleed of two adjacent colors printed during a single scan (e.g., swaths 110 and 111 in FIG. 14, scan 1), adjacent swaths (such as swaths 110 and 111) may be printed to effectively dovetail one another to avoid any well-defined interface between the two colors. This technique is known as shingling. The extent of dovetailing between two adjacent colors without creating visual artifacts may be determined on a empirical basis.

The above-described methods may be performed by various types of printers, including thermal and non-thermal types.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a color printer comprising the steps of:

scanning one or more printheads in a horizontal direction across a medium in said printer, said one or more printheads having a first linear nozzle array and associated ink ejection elements running perpendicular to a direction of scanning for ejecting ink of a first color, having a second linear nozzle array and associated ink ejection elements running perpendicular to said direction of scanning for ejecting ink of a second color, and having a third linear nozzle array and associated ink ejection elements running perpendicular to said direction of scanning for ejecting ink of a third color, nozzles in said first linear nozzle array being aligned in a horizontal direction with nozzles in said second linear nozzle array and said third linear nozzle array so that nozzles in said first linear array, said second linear array, and said third linear array scan over the same area of said medium during a single scan;

selectively energizing ink ejection elements from only a first group of said ink ejection elements in said one or more printheads, said first group of ink ejection elements being a first subset of said associated ink ejection elements of said first linear nozzle array, said associated ink ejection elements of said second linear nozzle array, and said associated ink ejection elements of said third linear nozzle array, and not energizing ink ejection elements not from said first group, during a first scan such that different color inks which are ejected from said first linear nozzle array, said second linear nozzle array, and said third linear nozzle array during said first scan do not overlap; and selectively energizing ink ejection elements from only a second group of said ink ejection elements in said one or more printheads during a second scan, subsequent to said first scan, said second group of ink ejection elements being a second subset of said associated ink ejection elements of said first linear nozzle array, said associated ink ejection elements of said second linear nozzle array, and said associated ink ejection elements of said third linear nozzle array, and not energizing ink ejection elements from said first group, said second subset being different from said first subset, such that different color inks which are ejected from said first linear nozzle array, said second linear nozzle array, and said third linear nozzle array during said second scan do not overlap.

2. The method of claim 1 further comprising the step of selectively energizing ink ejection elements from only a third group of said ink ejection elements in said one or more printheads during a third scan, subsequent to said second scan, said third group of ink ejection elements being a third subset of said associated ink ejection elements of said first linear nozzle array, said associated ink ejection elements of said second linear nozzle array, and said associated ink ejection elements of said third linear nozzle array, and not energizing ink ejection elements not from said third group, said third subset being different from said first subset and said second subset, such that different color inks which are ejected from said first linear nozzle array, said second linear nozzle array, and said third linear nozzle array during said third scan do not overlap.

3. The method of claim 2 wherein said ink ejection elements from said first group only eject ink of said first color, said ink ejection elements from said second group only eject ink of said second color, and said ink ejection elements from said third group only eject ink of said third color.

4. The method of claim 2 wherein each printhead of said one or more printheads includes ink ejection elements in a top section of said printhead, a middle section of said printhead, and a bottom section of said printhead, said ink ejection elements from said first group comprising only those ink ejection elements in said top section of a first printhead, said middle section of a second printhead, and said bottom section of a third printhead.

5. The method of claim 2 wherein said one or more printheads comprises three printheads.

6. The method of claim 5 wherein a first printhead of said three printheads prints cyan, a second printhead of said three printheads prints magenta ink, and a third printhead of said three printheads prints yellow ink.

7. The method of claim 2 wherein said one or more printheads comprises one printhead.

8. The method of claim 7 wherein a first portion of said printhead prints cyan ink, a second portion of said printhead prints magenta ink, and a third portion of said printhead prints yellow ink.

9. The method of claim 1 wherein the number of scans used for printing across said print area of said medium before said medium is shifted in a direction perpendicular to a direction of scanning is determined based upon the required color components to be printed.

10. The method of claim 1 wherein the number of scans used for printing across said print area of said medium before said medium is shifted in a direction perpendicular to a direction of scanning is a fixed number.

11. The method of claim 1 wherein said step of scanning further comprises scanning a fourth linear nozzle array and associated ink ejection elements for printing black ink, ink ejection elements associated with said fourth linear nozzle array printing black ink during a fourth scan different from said first scan.

12. The method of claim 1 wherein energizing said ink ejection elements during said first scan prints a swath having a first width, said method further comprising the steps of:

shifting said medium after said first scan in a direction perpendicular to a direction of said first scan by a distance approximately equal to one-third said first width;

selectively energizing ink ejection elements from said first group during a next scan; and repeating said steps of shifting and energizing said ink ejection elements from said first group until a desired three-color image is printed on said medium.

13. The method of claim 12 wherein each printhead of said one or more printheads includes ink ejection elements in a top section of said printhead, a middle section of said printhead, and a bottom section of said printhead, said ink ejection elements from said first group comprising only those ink ejection elements in said top section of a first printhead, said middle section of a second printhead, and said bottom section of a third printhead.

14. The method of claim 12 wherein said one or more printheads comprises a single printhead which includes ink ejection elements in a top section of said printhead, a middle section of said printhead, and a bottom section of said printhead, said ink ejection elements from said first group comprising ink ejection elements in said top section for printing ink of said first color, ink ejection elements in said middle section for printing ink of said second color, and ink ejection elements in said bottom section for printing ink of said third color.

15. A color printer comprising:

one or more printheads which are scanned across a medium to simultaneously print different colors of ink on said medium, said one or more printheads having a first nozzle array and associated ink ejection elements for printing ink of a first color, a second nozzle array and associated ink ejection elements for printing ink of a second color, and a third nozzle array and associated ink ejection elements for printing ink of a third color, said first nozzle array, said second nozzle array, and said third nozzle array all forming linear arrays running perpendicular to a direction of scanning of said one or more printheads, nozzles in said first nozzle array being aligned in a direction of scanning of said one or more printheads with nozzles in said second nozzle array and said third nozzle array so that nozzles in said first nozzle array, said second nozzle array, and said third nozzle array scan over the same area of a medium during a single scan of said one or more printheads; and a controller for selectively energizing said ink ejection elements from only a first group of said ink ejection elements in said one or more printheads, said first group of ink ejection elements being a first subset of said associated ink ejection elements of said first linear nozzle array, said associated ink ejection elements of said second linear nozzle array, and said associated ink ejection elements of said third linear nozzle array, and not energizing ink ejection elements not from said first group, during a first scan such that different color inks which are ejected from said first nozzle array, said second nozzle array, and said third nozzle array during said first scan do not overlap, wherein said controller also selectively energizes ink ejection elements from only a second group of said ink ejection elements in said one or more printheads during a second scan, subsequent to said first scan, said second group of ink ejection elements being a second subset of said associated ink ejection elements of said first linear nozzle array, said associated ink ejection elements of said second linear nozzle array, and said associated ink ejection elements of said third linear nozzle array, and does not energize ink ejection elements from said first group, said second subset being different from said first subset, such that different color inks which are ejected from said first nozzle array, said second nozzle array, and said third nozzle array during said second scan do not overlap.

16. The printer of claim 15 wherein said controller also selectively energizes ink ejection elements from only a third group of said ink ejection elements in said one or more printheads during a third scan, subsequent to said second scan, said third group of ink ejection elements being a third subset of said associated ink ejection elements of said first linear nozzle array, said associated ink ejection elements of said second linear nozzle array, and said associated ink ejection elements of said third linear nozzle array, and does not energize ink ejection elements not from said third group, said third subset being different from said first subset and said second subset, such that different color inks which are ejected from said first nozzle array, said second nozzle array, and said third nozzle array during said third scan do not overlap.

17. The printer of claim 16 wherein said ink ejection elements from said first group only eject ink of said first color, said ink ejection elements from said second group only eject ink from said second color, and said ink ejection elements from said third group only eject ink of said third color.

18. The printer of claim 15 wherein energizing said ink ejection elements during said first scan prints a swath having a first width, said printer further comprising a forwarding means to shift said medium after said first scan in a direction perpendicular to said first scan by a distance approximately equal to one-third said first width.

19. The printer of claim 15 wherein said one or more printheads comprises three printheads.

* * * * *